Sept. 30, 1958          R. H. FORD          2,853,853
COAXIAL COMBUSTION PRODUCTS TURBINE
Filed Nov. 9, 1954          4 Sheets-Sheet 1
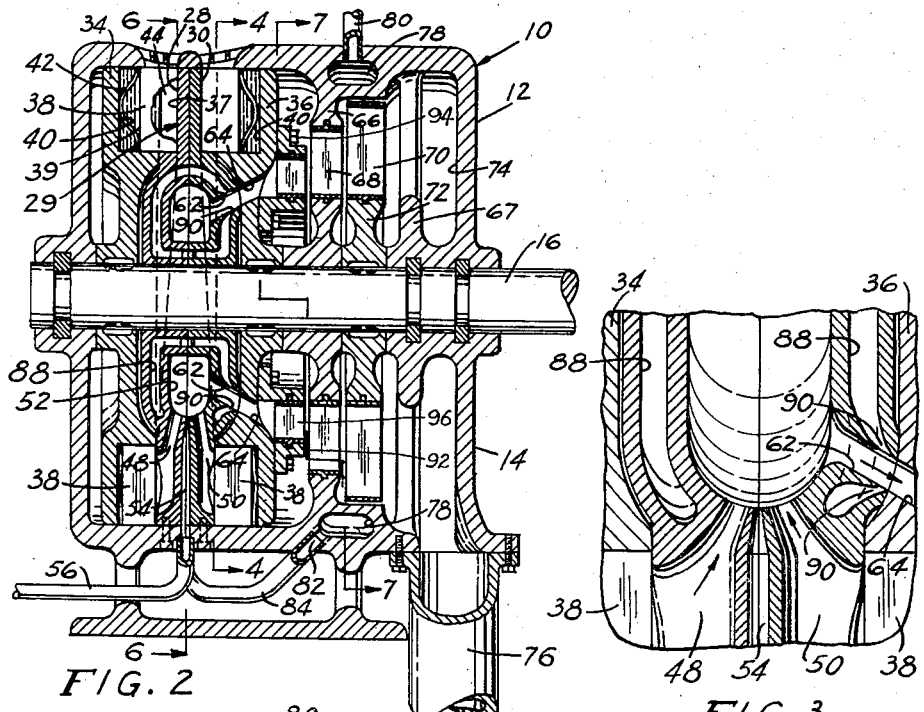
FIG. 2
FIG. 3
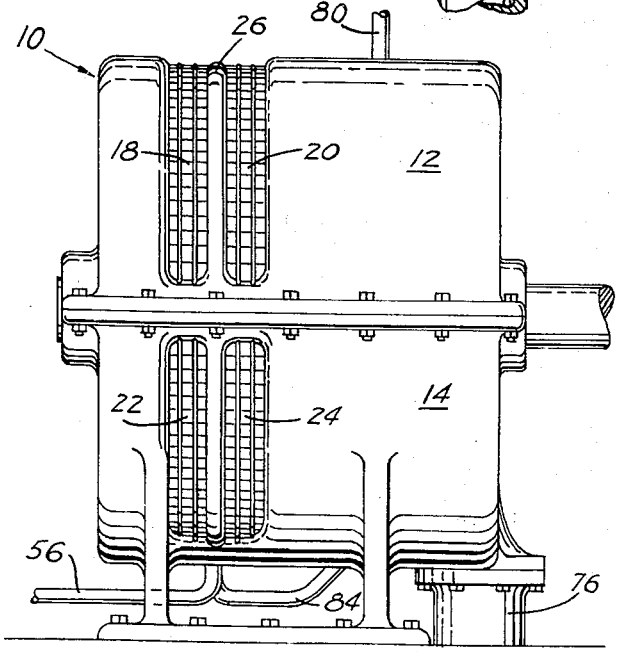
FIG. 1
INVENTOR.
RICHARD H. FORD
BY Sept. 30, 1958
R. H. FORD
2,853,853
COAXIAL COMBUSTION PRODUCTS TURBINE
Filed Nov. 9, 1954
4 Sheets-Sheet 2
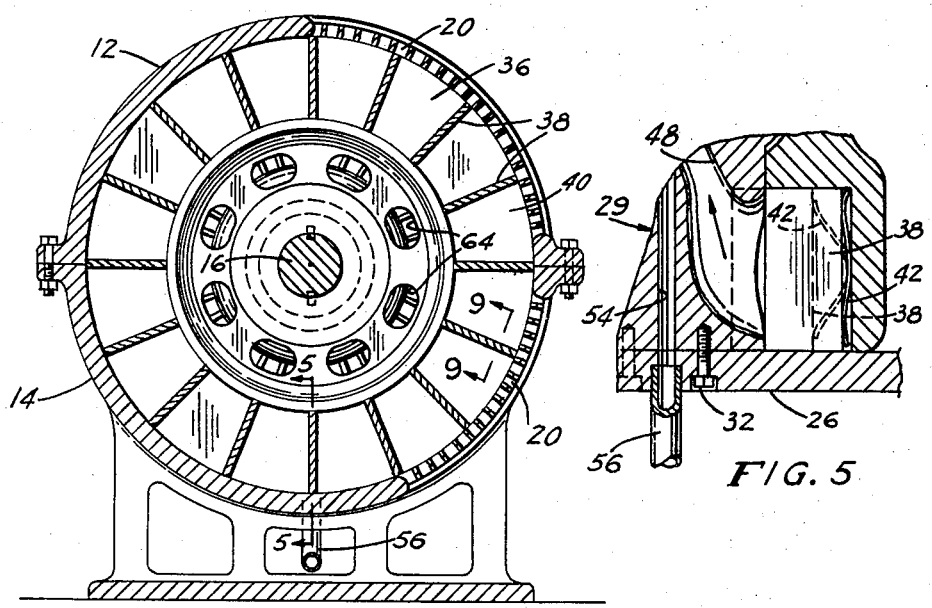
FIG. 4
FIG. 5
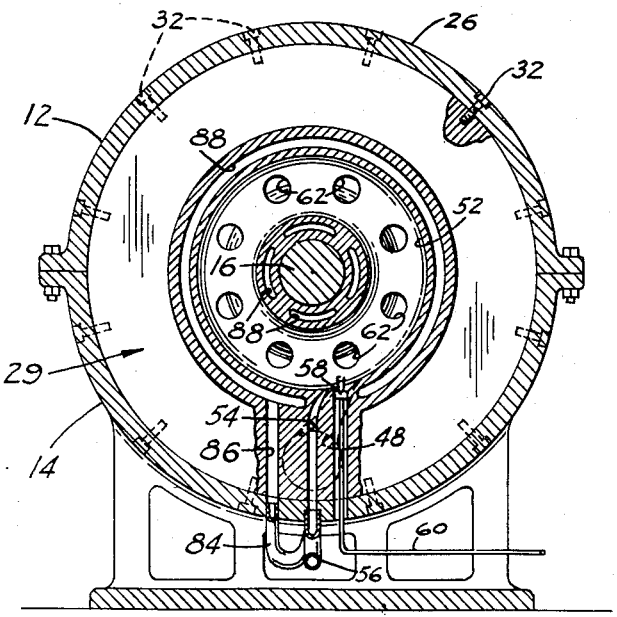
FIG. 6
INVENTOR.
RICHARD H. FORD
BY Sept. 30, 1958     R. H. FORD     2,853,853
COAXIAL COMBUSTION PRODUCTS TURBINE
Filed Nov. 9, 1954     4 Sheets-Sheet 3

INVENTOR.
RICHARD H. FORD
BY 2,853,853

COAXIAL COMBUSTION PRODUCTS TURBINE

Richard H. Ford, Whitman, Mass.

Application November 9, 1954, Serial No. 467,677

3 Claims. (Cl. 60—39.58)

This invention relates to rotary engines and more particularly to gas turbines.

One of the chief causes of inefficiency of the gas turbine is the relatively low compression and pressure under which ignition of the combustible fuel takes place so that maximum benefit may not be obtained from the resultant expanding gases to provide energy imparted to the turbine to drive the turbine shaft. Therefore, it is the principal object of this invention to provide a gas turbine in which the pressure under which the combustion takes place may be greatly increased.

It is a further object of this invention to provide a high-compression pressure gas turbine in which cooling water is employed adjacent the combustion chamber to absorb the heat resulting from the combustion of the fuel under pressure and thereby turn this otherwise waste heat into energy by causing the water to be heated and turned into steam, which steam may be directed into the turbine to assist in causing rotation of the turbine wheels and hence drive the turbine drive shaft.

Also, with the use of water about the combustion chamber, the efficiency of the gases resulting from the combustion may provide greater efficiency as well as the parts of the apparatus surrounding the combustion chamber be prevented from becoming overheated.

Yet another object of this invention is to provide a high-compression pressure gas turbine of simple yet sound construction capable of heavy-duty use over an extended period of time with a minimum of shutdown time for maintenance, and which will be economical in operation as well as being constructed of relatively few, simple parts.

Other objects and advantages will become apparent from a consideration of the following detailed description, forming the specification, and taken in conjunction with the accompanying drawings, in which:

Figure 1 is a side elevational view of a gas turbine embodying this invention;

Figure 2 is a longitudinal vertical cross sectional view of the gas turbine of Figure 1;

Figure 3 is an enlarged, fragmentary view of the air and fuel intake portion of the combustion chamber portion shown in Figure 2;

Figure 4 is a vertical or cross sectional view taken substantially along the line 4—4 of Figure 2;

Figure 5 is a cross sectional view taken substantially along the line 5—5 of Figure 4;

Figure 6 is a vertical cross sectional view taken substantially along line 6—6 of Figure 2 and looking in the direction of the arrows;

Figures 7, 9:
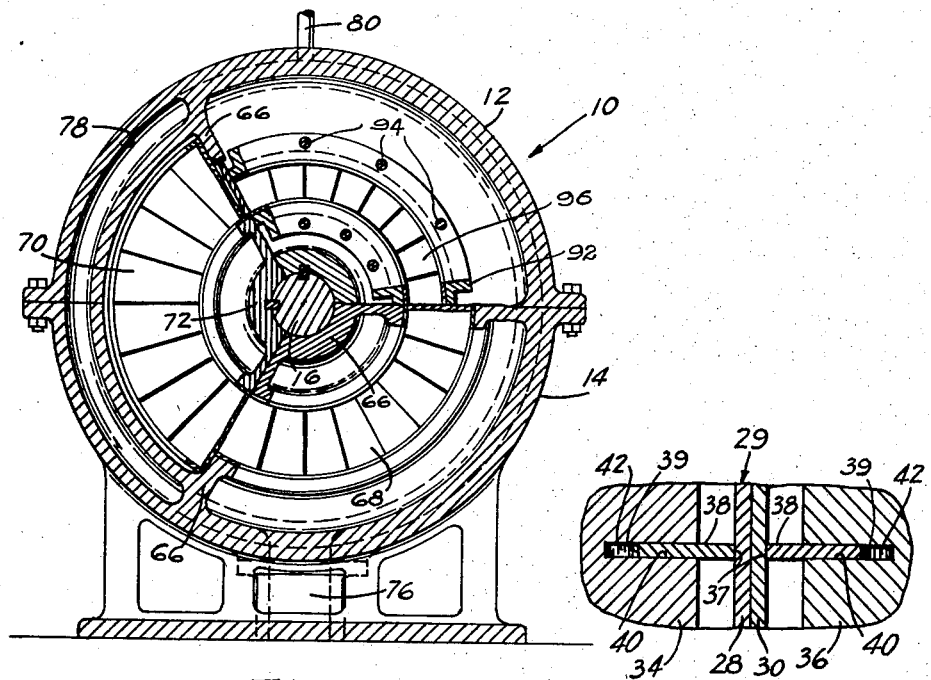
Figure 7 is a vertical cross sectional view taken substantially along the line 7—7 of Figure 2 and looking in the direction of the arrows.
Figure 9 is a sectional view taken along line 9—9 of Figure 4.
Figure 8:
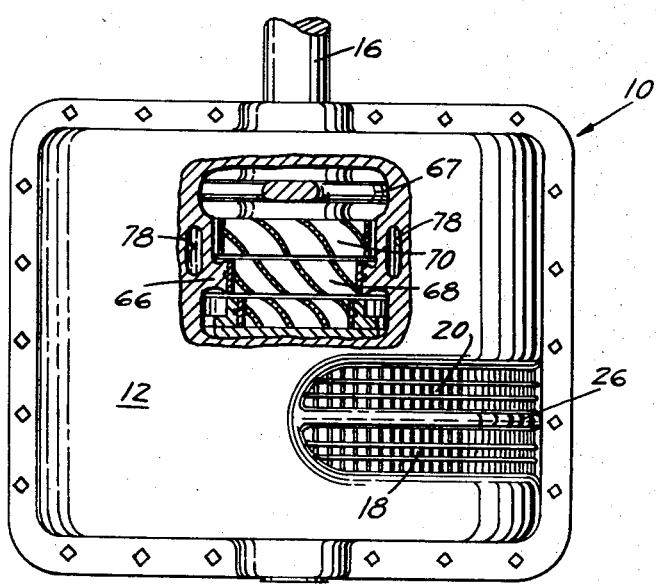
Figure 8 is a top plan view with a portion thereof broken away to show internal construction.

With continued reference to the drawings, there is shown a gas turbine, generally indicated at 10, constructed in accordance with this invention. The turbine 10 comprises an outer housing composed of two semi-cylindrical sections 12 and 14 bolted together along mating, longitudinally extending flanges to provide the turbine casing.

A turbine shaft 16 is journaled at one end in the turbine casing for rotation and is also journaled intermediate its ends at the opposite end of the casing so that the shaft extends longitudinally and centrally through the casing, as clearly shown in Figure 2. The usual seals and bearings may be provided for the shaft 16.

The turbine casing is provided with pairs of air inlet openings 18, 20 and 22, 24 in the respective casing such as 12 and 14 and extend circumferentially about one-half of each of the casing sections from adjacent the flanges whereby the sections are connected to the respective upper and lower ends of the casing. Each of the air inlet openings is preferably provided with a protective grill extending thereacross.

An encircling rib 26 forming a part of the turbine casing, is disposed between the air inlet openings 18, 20 and 22, 24. A two-part wedge shaped disc having divergent side surfaces, generally indicated at 29, made of complementarily formed and opposed sections 28 and 30, which sections are secured together in face-to-face relation by bolts 32 countersunk in the rib 26 and entering into suitably tapped openings in the compression blade sections 28 and 30 so as to fixedly secure the wedge shaped disc within the turbine casing and which sections extend transversely thereof.

The wedge shaped disc 29 is provided with the central opening therethrough for the reception therethrough of the turbine shaft 16.

A pair of blade wheels 34 and 36 of identical construction are keyed to the shaft 16 and disposed in opposed relation to opposite sides of the wedge shaped disc 29.

Figure 10:
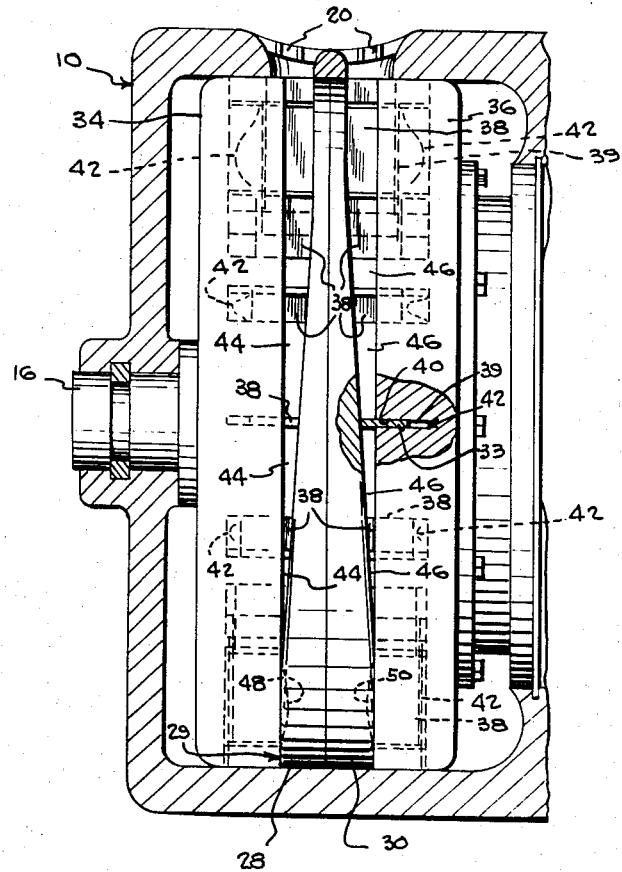
Figure 10 is a vertical cross sectional view through a portion of the turbine to show the relation of the blade wheels to the disc and the formation of air pockets between the movable blades on the wheels.

Each of the blade wheels 34 and 36 is provided with a plurality of circumferential equally spaced transverse slots 40 opening to the side thereof adjacent said disc 29. A reciprocating valve blade 38 is disposed within each of the slots 40. A leaf spring 42 is disposed between the one edge 39 of each of the reciprocating valve blades and the closed end of the slot 40 so as to urge the blades outwardly therefrom toward the respective compression blade sections 28 and 30. As shown in Figure 10, the compression of wedges of air 44 and 46 are disposed in the space along opposite outer sides of the disc 29 and against which the opposite edge 37, that is the edge remote from the edge 39, of each of the reciprocating valve blades 38 will ride. The wider end of each of the compression wedges, formed as the outer opposite side walls of the disc 29, is disposed along the outer peripheral edge of the blade wheels 36 and 34 with the narrow ends thereof disposed adjacent the air discharge passages 48 and 50 provided adjacent the lower end of the compression blade sections 28 and 30. The air discharge passages 48 and 50 lead upwardly through the compression blade into an annular combustion chamber 52 formed concentrically with the shaft 16 and in the disc 29 as clearly shown in Figure 2.

Considering the disc 29 as a single unit into which the air passages 48 and 50 are provided, it will be noted that the portion of the air disc against which the valve blades 38 ride is thinner at the top of the casing than at the bottom. This transition, from thick to thin around the circumference is represented by the converging broken lines in Figure 2 while the parallel dotted lines represent the faces of the blade wheels 34 and 36. This relationship is shown more clearly in Figure 10.

Thus, the difference in thickness of the disc, changes the clearance between the disc and the blade wheels from practically no clearance at the bottom to a relatively large clearance at the top. The valve blades carried by the blade wheels 34 and 36 are constantly in contact with the disc 29 and with the housings 12 and 14 to create individual pockets or wedges of air 44 and 46 around the entire circumference. These pockets of air carried around by the blade wheels and valve blades as the blade wheels rotate. As the blade wheels are rotated, the area of each individual pocket is increased as the clearance between the blade wheel and the disc is increased; and decreased as the clearance between the blade wheel and the disc is decreased. The air inlet openings 18, 20, 22 and 24 are provided approximately about one-half of the outer circumference of the casing which open these pockets to the atmosphere. The rotation of the turbine is such that the area of the pockets is increased as they pass these air inlet openings. In the present illustration, the rotation would be clockwise and viewed from the exhaust end of the turbine. As the pockets rotate from the bottom to the top across these air intakes, the area of each pocket is increased to draw air thereinto. These air inlets end at the point of greatest wedge or pocket area. Continuing the rotation of the blade wheels and the air pockets from the top to the bottom, there is provided completely closed wedges or pockets of air. Hence, these wedges or pockets of air rotate toward the bottom of the casing, the area decreases, compressing the trapped air. At the lowest point of rotation, there is achieved a minimum pocket area and maximum air pressure adjacent the passages 48 and 50 allowing the trapped compressed air to escape into these passages and into the combustion chamber 52 under pressure.

A fuel jet nozzle 54 is inserted into a suitably formed opening in the lower portion of the compression blade 29 in between the sections 28 and 30 thereof so as to have the nozzle end thereof opening into the combustion chamber 52 while the other end of the nozzle projects outwardly from and through the turbine casing for connection to a flexible hose 56 which is attached to a source of fuel, preferably pumped under pressure into the fuel nozzle so that the fuel may be ejected into the combustion chamber 52 where it will mix with the air discharged thereinto under compression in the manner hereinbefore set forth. An ignition device, indicated at 58 (Figure 6) is provided within the combustion chamber 52 adjacent the end of the opening 54 defining the fuel jet nozzle so that the fuel may be ignited thereby. The ignition device may be in the form of a sparking device having an electrical connection through a wire 60 leading upwardly through a suitably formed opening in the compression blade 29 and in spaced parallel relation to the fuel jet nozzle 54.

Thus, the fuel and air mixture may be ignited within the combustion chamber 52 and the resultant gases discharged through openings 62 in the compression blade section 30. The openings 62 communicate with similar openings 64 through the blade wheel 36 which will be brought into register herewith as the blade wheel rotates. The gases will first impinge upon the directional blades or vanes 96 and then impinge upon the stationary turbine nozzles 66 so as to pass through the vanes 68 thereon and be directed onto the buckets or vanes 70 of a movable turbine wheel 72 keyed to the shaft 16 so as to impart rotation thereto. The gases may then escape through an annular chamber 74 formed in the turbine casing adjacent one end thereof and thence be led outwardly therefrom through a dishcarge line or exhaust 76.

An annular water jacket 78 is cored into the casing sections 12 and 14 so as to form a continuous annular opening about the movable blade 70 to effect a cooling thereof. Water may be introduced into the annular water jacket opening 78 through a flexible hose 80. A water discharge opening 82 is provided in the lower casing section 14 so that one end thereof is in communication with the water jacket opening 78 and the other end thereof opens to the exterior of the casing section. A flexible hose 84 leads the water from jacket 78 since one end of the hose is inserted within the opening 82, to form a water by-pass from the casing or shell and leads into the lower end of a vertically disposed water passage 86 formed in the lower end of the compression blade 29 in spaced relation to the jet nozzle 54 and to the side remote from the side through which the wire 60 to the ignition device 56 is introduced therethrough.

The upper end of the water passage 86 opens into a water jacket 88 generally concentric with the combustion chamber 52 and surrounding the chamber as clearly shown in Figure 2, the water jacket 88 is in the form of a plurality of interconnected, generally circular passages completely surrounding the combustion chamber 52, with the water supplied from the water supply hose 80 being introduced and circulated therethrough.

As the fuel and air mixture in the combustion chamber is ignited and burned, the resultant heat will be absorbed by the water in the water jacket 88 and at such time as the heat generated is sufficient, the water will turn into steam and be discharged through openings 90 provided at one end of each of the interconnected water jacket passages and leading into a discharge opening 62 and thus be introduced through the registering gas discharge openings 64 and thence impinge against the stationary turbine wheel blades 68 to be directed to the movable turbine wheels or blades or vanes 70 to assist in imparting rotation thereto. Thereby, the heat generated by the combustion of the fuel and air mixture in the combustion chamber 52 will be utilized to provide steam generating energy transformed into rotation of the drive shaft 16 as well as providing a coolant about the combustion chamber 52.

It will be seen that a blade wheel 92 is secured to the outer face of the blade wheel 36 of the compression blade section 30 by circumferentially spaced bolts 94 to rotate therewith for the purpose of directing the expanding gases and steam issuing from the discharge openings 64 and througuh the directional blades or vanes 96 so as to forcibly impinge upon the vanes of the movable turbine wheel 72 after passing through the blades 68 or the stationary turbine nozzle 66.

In order to start the gas turbine 10, some external source of starting power may be utilized, such as a starting motor, not shown, in the usual manner. The starting power may be discontinued as soon as the operation of the turbine is self-sufficient to the extent that the blade wheels 34 and 36 will provide a flow of air under compression to the combustion chamber 52. At that time, the turbine 10 will be self-operating.

As usual in many types of turbines, a second stationary turbine wheel 67 will be provided at the other side of the movable turbine wheel 72 so as to direct the exhaust gases from the wheel 72 into the annular chamber 74.

While there is shown and described the preferred embodiment of the invention, it is to be understood that the structure is susceptible to change and modification within the practicability of the invention and therefore should be limited only by the scope of the claims appended hereto.

What is claimed is:

1. A rotary gas engine comprising a casing having a rotatable shaft extending centrally longitudinally thereof, a turbine wheel secured to said shaft for imparting rotation thereto, a wedge shaped disc having divergent side surfaces adjacent its periphery extending transversely of said casing therewithin, said disc having a combustion chamber formed therein, means for injecting fuel into said chamber, means carried by said shaft and rotatable thereby cooperating with said divergent side surfaces for supplying air under pressure to the combustion chamber to be mixed with said fuel injected thereinto, and an ignition device disposed within said chamber to cause ignition of the fuel-air mixture for producing expandable gases to be directed against said turbine wheel, said disc having air admitting passages therein and gas discharge passages extending about the periphery thereof with said divergent side surfaces being narrowest at the mouth of said air discharge passages, each of said air admitting passages opening at one end into said chamber, said means for supplying air under pressure to said combustion chamber comprising a pair of blade wheels carried by said shaft and disposed on opposite sides of said disc, each of said blade wheels having a plurality of transverse equally circumferentially spaced slots therein opening to the side of the wheel adjacent said disc, a spring urged reciprocating blade disposed within each of said slots for movement transversely of the wheel and having one edge thereof riding on the adjacent divergent side surfaces of said disc to compress the air between adjacent blades as the blade wheels are rotated from the wide to the narrow portion of said divergent side surfaces and force the air through said air discharge passages into said chamber under pressure.

2. A rotary gas engine comprising a casing having a rotatable shaft extending centrally longitudinally thereof, a turbine wheel secured to said shaft for imparting rotation thereto, a wedge shaped disc having divergent side surfaces adjacent its periphery extending transversely of said casing therewithin, said disc having a combustion chamber formed therein, means for injecting fuel into said chamber, means carried by said shaft and rotatable thereby cooperating with said divergent side surfaces for supplying air under pressure to the combustion chamber to be mixed with said fuel injected thereinto, and an ignition device disposed within said chamber to cause ignition of the fuel-air mixture for producing expandable gases to be directed against said turbine wheel, said disc having a plurality of gas discharge openings in one side thereof opening at one end of said chamber, said means for supplying air under pressure to said combustion chamber comprising a blade wheel carried by said shaft disposed adjacent said one side of said disc and having a plurality of openings therein adapted to register with the other end of said gas discharge openings to permit the expanding gases to enter the casing wherein the turbine wheel is disposed and be directed against the turbine wheel.

3. A rotary gas engine comprising a casing having a rotatable shaft extending centrally longitudinally thereof, a turbine wheel secured to said shaft for imparting rotation thereto, a wedge shaped disc having divergent side surfaces adjacent its periphery extending transversely of said casing therewithin, said disc having a combustion chamber formed therein, means for injecting fuel into said chamber, means carried by said shaft and rotatable thereby cooperating with said divergent side surfaces for supplying air under pressure to the combustion chamber to be mixed with said fuel injected thereinto, and an ignition device disposed within said chamber to cause ignition of the fuel-air mixture for producing expandable gases to be directed against said turbine wheel, said disc having a plurality of gas discharge openings in one side thereof opening at one end of said chamber, said means for supplying air under pressure to said combustion chamber comprising a blade wheel carried by said shaft disposed adjacent said one side of said disc and having a plurality of openings therein adapted to register with the other end of said gas discharge opening to permit the expanding gases to enter the casing wherein the turbine wheel is disposed and be directed against the turbine wheel, said disc also having a water jacket therein surrounding said combustion chamber, means for feeding water into said jacket, the water in said jacket absorbing heat from the ignition of the air and fuel mixture to cool the chamber and turns the water into steam which is directed against the turbine wheel to assist in imparting rotation thereto and to said shaft, said water jacket having discharge openings communicating with said gas discharge openings through which steam generated therein can enter said gas discharge openings and flow through said openings in said blade wheel to be directed against the turbine wheel.

References Cited in the file of this patent

UNITED STATES PATENTS

| | | |
|---|---|---|
| 1,931,207 | Roberts | Oct. 17, 1933 |
| 2,359,108 | Hoskins | Sept. 26, 1944 |
| 2,471,892 | Price | May 31, 1949 |
| 2,595,505 | Bachle | May 6, 1952 |

FOREIGN PATENTS

| | | |
|---|---|---|
| 29,589 | Great Britain | 1906 |